US006422899B1

(12) United States Patent
Miyazaki

(10) Patent No.: US 6,422,899 B1
(45) **Date of Patent: *Jul. 23, 2002**

(54) PANEL MOUNTING CONNECTOR

(75) Inventor: Sho Miyazaki, Nagoya (JP)

(73) Assignees: Autonetworks Technologies, Ltd., Nagoya; Sumitomo Wiring Systems, Ltd, Mie; Sumitomo Electric Industries, Ltd., Osaka, all of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/650,677

(22) Filed: Aug. 30, 2000

(30) Foreign Application Priority Data

Aug. 30, 1999 (JP) .......................................... 11-243866

(51) Int. Cl.[7] .................................................. H02B 1/01

(52) U.S. Cl. ....................................... 439/559; 439/271

(58) Field of Search ................................ 439/556, 548, 439/559, 271, 569; 200/302.1, 296

(56) References Cited

U.S. PATENT DOCUMENTS

| | | | | |
|---|---|---|---|---|
| 2,941,182 A | * | 6/1960 | Heller | 439/559 |
| 3,398,391 A | * | 8/1968 | Brishka | 439/559 |
| 4,676,575 A | * | 6/1987 | Denlinger et al. | 439/271 |
| 5,752,852 A | * | 5/1998 | Onoda | 439/559 |
| 6,113,424 A | * | 9/2000 | Shinozaki | 439/559 |

FOREIGN PATENT DOCUMENTS

| | | | | |
|---|---|---|---|---|
| FR | 2456406 | * | 1/1981 | 439/559 |
| GB | 1406037 | * | 9/1975 | 439/559 |

* cited by examiner

*Primary Examiner*—P. Austin Bradley
*Assistant Examiner*—Lorisa Tsukerman
(74) *Attorney, Agent, or Firm*—Oliff & Berridge, PLC

(57) ABSTRACT

In the case housing component members are assembled, flanges formed in the housing component members are superimposed, with engagement pieces elongating from a packing interposed therebetween. Accordingly, the packing cannot be fall off from the aluminum flange so that the operation of mounting the connector on a panel (shield wall) can be facilitated .

8 Claims, 7 Drawing Sheets

PANEL MOUNTING CONNECTOR

BACKGROUND OF THE INVENTION

1. Field of the Invention

The present invention relates to a panel mounting connector.

2. Description of the Related Art

In general, a panel mounting connector comprises a packing on a flange, projecting sideward from a connector housing, so as to be mounted, with the packing interposed between the flange and an opening rim of a connector mounting hole formed in a panel However, according to the panel mounting connector, the packing may fall off from the flange at the time of mounting on the panel, and thus the mounting operation is difficult.

SUMMARY OF THE INVENTION

In view of the circumstances, an object of the invention is to provide a panel mounting connector without the risk of fall-off of a packing from a flange.

A first aspect of the invention is a panel mounting connector comprising a pair of housing component members to be assembled with each other for providing a connector housing, a housing engagement means for maintaining the housing component members in the assembled state, a first flange, projecting sideward from one of the housing component members, a second flange, projecting sideward from the other one of the housing component members at a lower level with respect to the first flange, so as to be superimposed on the first flange, a packing provided on the first flange so as to surround the outer side of the second flange, and an engagement piece, elongating inward from the packing, interposed between the first flange and the second flange, wherein the first flange is mounted by forcing the packing on an opening rim of a connector mounting hole formed in a panel.

A second aspect of the invention is the panel mounting connector according to the first aspect, wherein butting parts are provided in the housing component members for positioning the housing component members according to contact with each other such that a gap is formed between the flanges, with the engagement piece stored in the gap.

According to the configuration of the first aspect, when the housing component members are assembled, the first and second flanges are superimposed, with the engagement piece provided elongating from the packing interposed therebetween. Accordingly, the risk of fall-off of the packing from the connector can be eliminated, and thus the operation of mounting the connector on the panel can be facilitated.

According to the configuration of the second aspect, since the gap between the flanges can always have a constant distance according to the contact of the butting parts, the engagement piece stored therein can never be forced excessively. Accordingly, the problem of deteriorating the water proof property due to strong strain on the packing main body can be prevented as well as the housing component members can be positioned accurately according to contact of the butting parts without suffering the influence of the deformation amount of the engagement piece.

DETAILED DESCRIPTION OF THE PRESENT INVENTION

Figure 1:
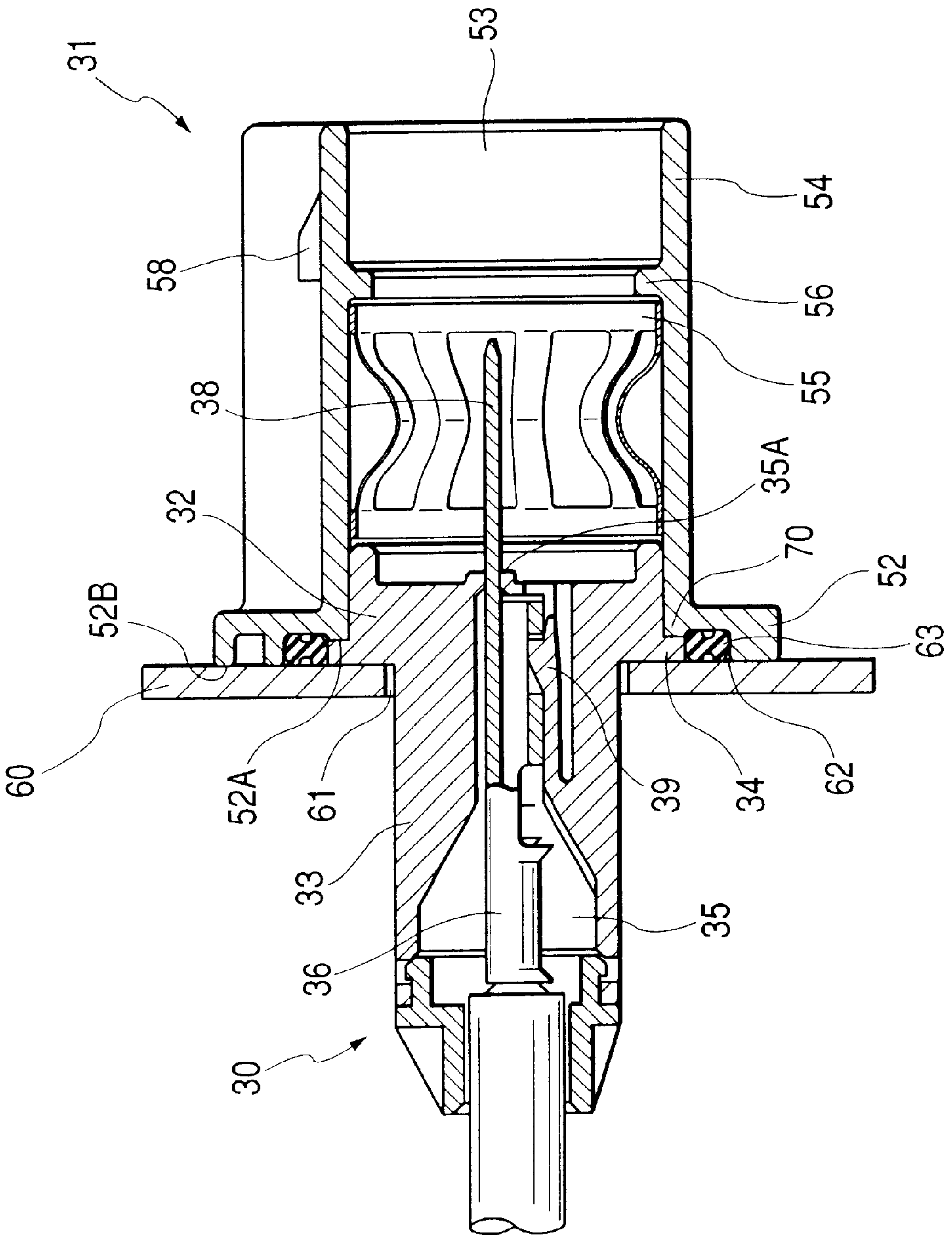
FIG. 1 is a side cross-sectional view of a connector according to an embodiment of the invention.

Hereinafter, an embodiment of the invention will be explained with reference to FIGS. 1 to 7. A panel mounting connector (hereinafter referred to simply as "connector") according to the embodiment is a type to be mounted on a shield wall 60 (corresponding to a panel of the invention) comprising an electric appliance for shielding a terminal metal fixture. As shown in FIG. 1, it comprises a first housing component member 30 and a second housing component member 31, assembled with each other.

Figure 2:
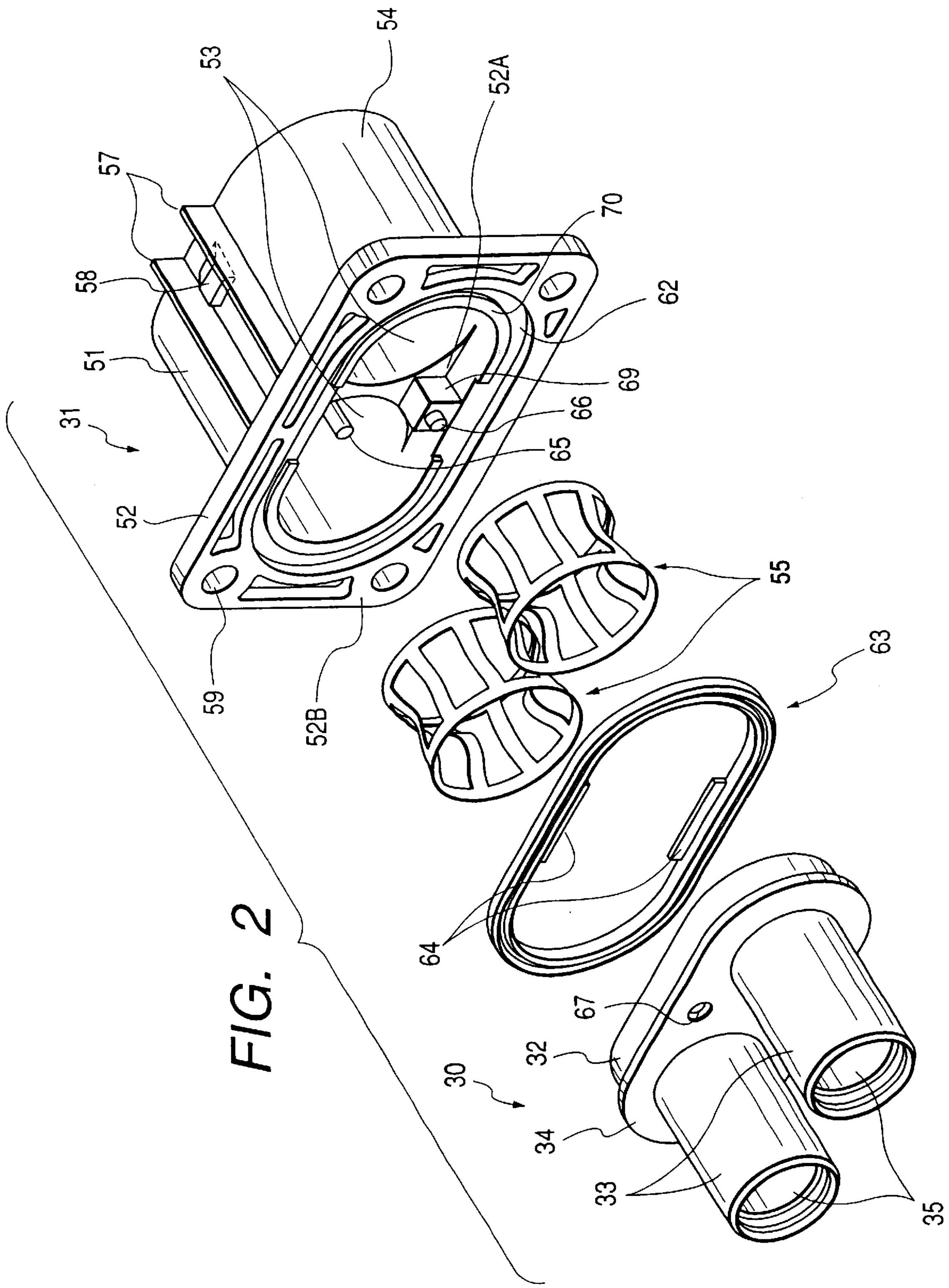
FIG. 2 is an exploded perspective view of the connector
Figure 3:
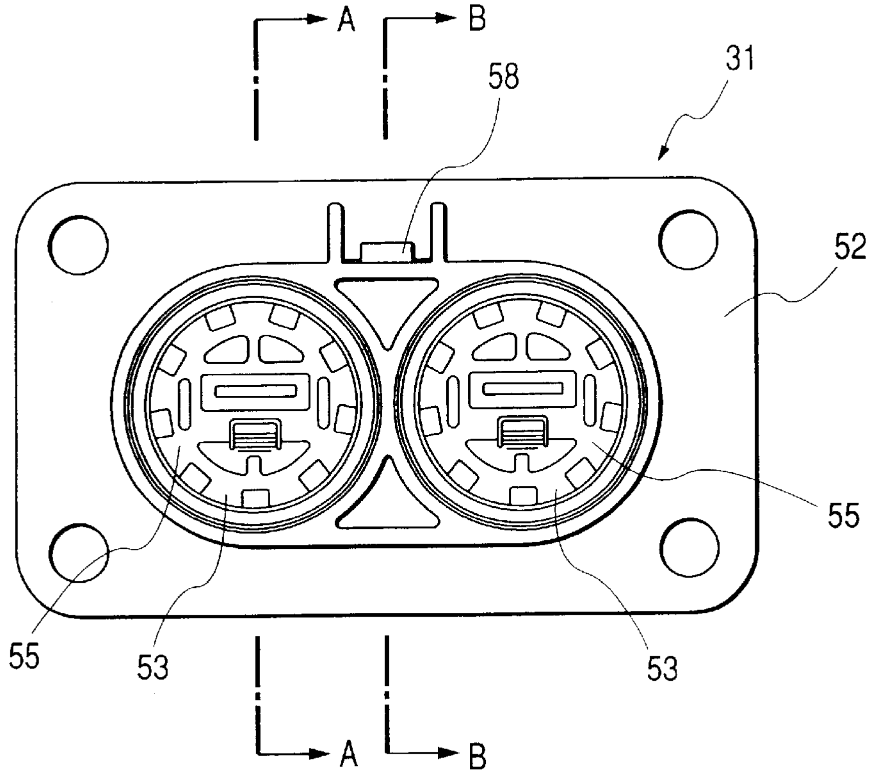
FIG. 3 is a plan view of the connector.
Figure 4:
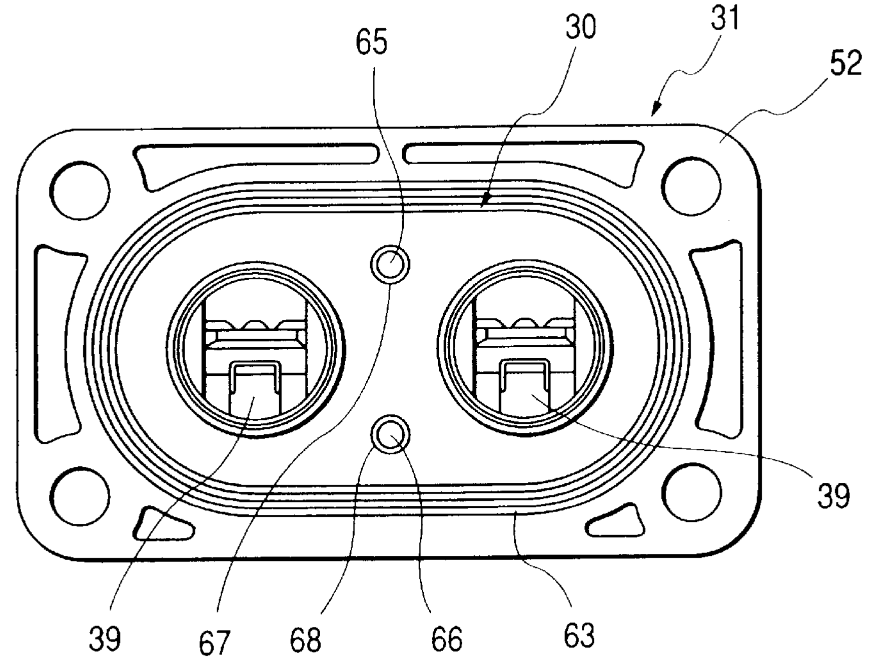
FIG. 4 is a rear view of the connector.

The first housing component member 30 shown in the left down side of FIG. 2 in the entirety comprises a pair of cylindrical parts 33, 33 with an elliptical cross-section, elongating parallel from an end face of an insulating resin base part 32 flat in the axial direction. Cavities 35, 35 are formed through the cylindrical parts 33, 33 and the base part 32, for storing male terminal metal fixtures 36 therein (see FIG. 1).

In contrast, the second housing component member 31 shown in the right upper side of FIG. 2 in the entirety is an aluminum die-cast having a conductivity. The structure is as follows. That is, a main part 51 having an elliptical cross-section comprises an aluminum flange 52 with an oblong rectangular shape, and a recess part 52A recessed from the aluminum flange 52 to a halfway part in the axial direction of the main part 51. The base part 32 of the first housing component member 30 is fitted in the recess part 52A (see FIG. 1).

A pair of communication holes 53, 53 are formed through the main part 51, corresponding to the cavities 35, 35 in the front and back direction, with one end thereof opened to the deep surface of the recess part 52A. As shown in FIG. 1, tubs 38 comprising the male terminal metal fixtures 36 project from the front surface of the base part 32 to the inside of the communication holes 53 so that the peripheral walls of the communication holes 53 provide hood parts 54 for receiving a counterpart connector (not illustrated)

Moreover, as shown in FIG. 1, projecting bars 56 are formed in a halfway part of the inner peripheral surface of the hood parts 54, projecting inward, with contacts 55 assembled between the projecting bars 56 and the first component member 30, The contacts 55 have a structure provided by dividing the middle part of cylindrical metal plates into a plurality of strips, and bulging the same inward.

Furthermore, a lock projecting part 58 to be engaged with a lock arm (not illustrated) comprising the counterpart connector is provided on the upper surface of the main part 51 shown above in FIG. 2.

As shown in FIG. 2, four bolt holes 59 are formed through in the four corners of the aluminum flange 52. With the aluminum flange 52 butted against the peripheral rim of connector mounting holes 61 formed in the shield wall 60, bolts (not illustrated) are inserted through the bolt holes 59 so as to be screwed into the shield wall 60.

A ring-like groove 62 is formed in the butted surface 52B of the aluminum flange 52 with respect to the shield wall 60 by recessing the inner rim side thereof recessed to the side away from the shield wall 60. As shown in FIG. 1, a resin flange 34 comprising the first housing component member 30 is butted against the inner rim side of the deep wall of the ring-like groove 62, with a packing 63 provided on the outer side of the resin flange 34. Moreover, a butting projecting bar 70 projects toward the resin flange 34 from a part of the deep wall of the ring-like groove 62 facing to the resin flange 34. The butting projecting bar 70 is cut off partially (see FIG. 6), with a gap 71 formed in the cut-off part between the flanges 34, 52 for storing engagement pieces 64 to be described later.

Figure 6:
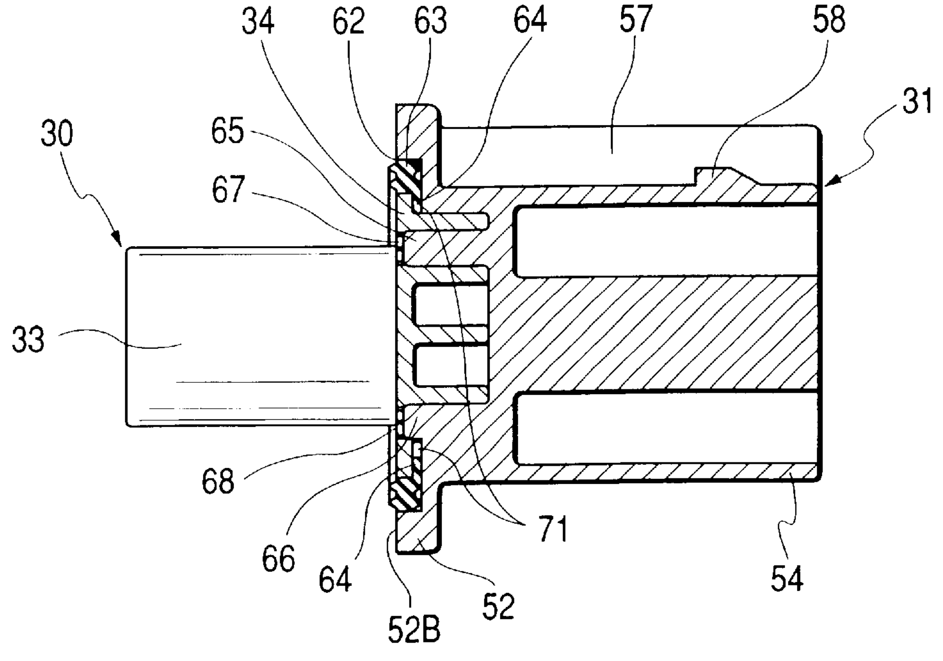
FIG. 6 is a side cross-sectional view taken on the cutting plane B—B in FIG. 3.
Figure 7A:
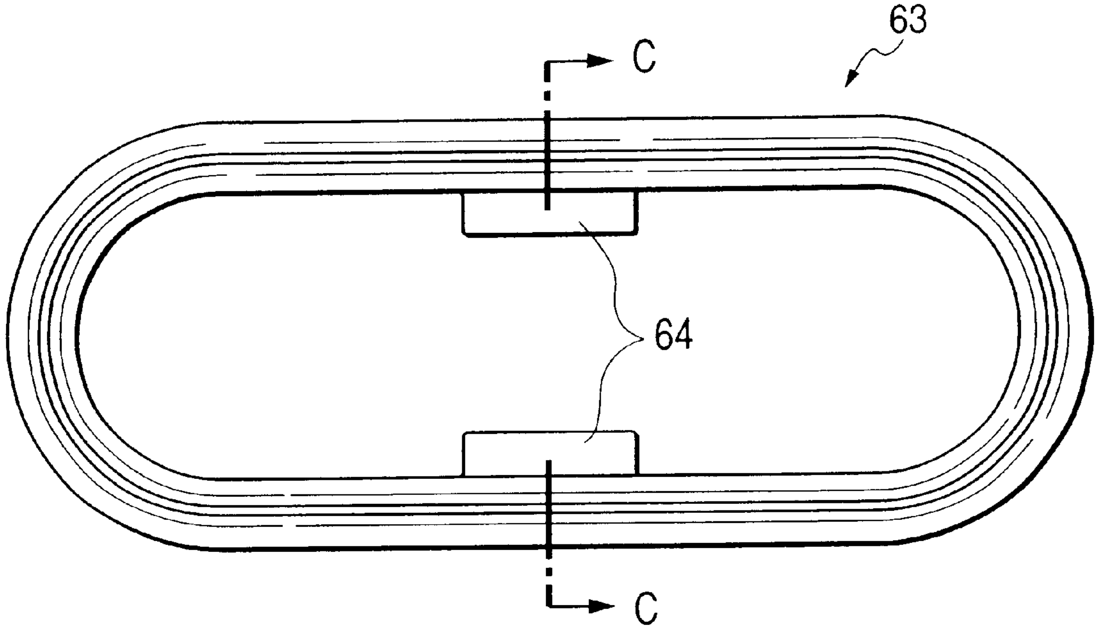
FIG. 7A is a plan view of a packing.
Figure 7B:
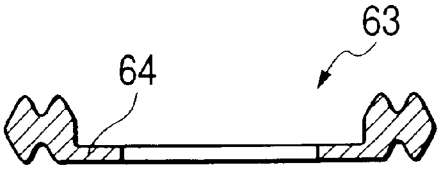
FIG. 7B is a cross-sectional view thereof taken on the cutting plane C—C.

Details of the packing 63 are shown in FIGS. 7A and 7B. As shown in FIG. 7A, the packing 63 comprises the engagement pieces 64, 64 projecting from the upper and lower parts of the inner peripheral surface of the packing 63 in the direction approaching with each other. The engagement pieces 64 are disposed eccentrically to the aluminum flange 52 side (see FIGS. 6 and 7B) on the inner peripheral surface of the packing 63 so as to be stored in the gap 71 of the cut-off part of the butting projecting bar 70.

As shown in FIG. 6, the housing component members 30, 31 are positioned and stopped by pressing a pair of pins 65, 66 projected rearward from the second housing component member 31 into a pair of press-in holes 67, 68 formed in the first housing component member 30.

Next, operation of this embodiment will be explained.

In assembling the connector of this embodiment, for example, with the recess part 52A of the second housing component member 31 oriented upward, the contacts 55, 55 are stored in each of the communication holes 53, 53 opened at the deep side of the recess part 52A as well as the packing 63 is provided on the ring-like groove 62 at the peripheral rim of the recess part 52A. Here, the engagement pieces 64 on the packing 62 are disposed at the part with the butting projecting bar 70 cut off in the deep surface of the recess part 52A.

Figure 5:
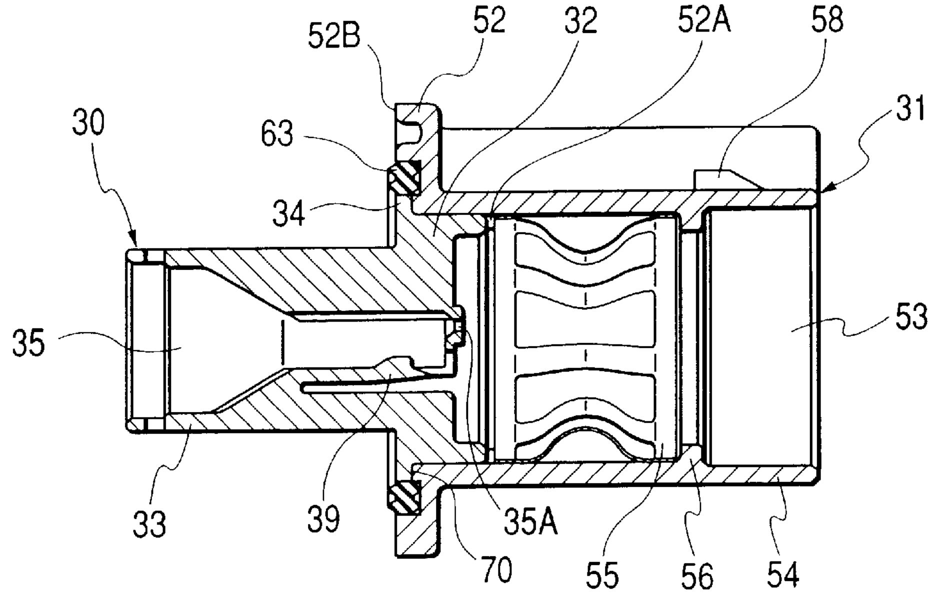
FIG. 5 is a side cross-sectional view taken on the cutting plane A—A in FIG. 3.

Next, the housing component members 30, 31 are forced strongly against with each other, with the base part 32 of the first housing component member 30 placed on the recess part 52A so as to have the pins 65, 66 and the press-in holes 67, 68 face with each other. Accordingly, the pins 65, 66 enter into the press-holes 67, 68 until the butting projecting bar 70 and the resin flange 34 contact with each other as shown in FIG. 5 so as to complete the assembly of the housing component members 30, 31. Then, as shown in FIG. 6, the engagement pieces 64 are stored in the gap 71 between the flanges 34, 52 so as to be interposed between the flanges 34, 52. According to press-in fitting of the pins 65, 66 and the press-in holes 67, 68, the housing component members 30, 31 are maintained in the assembled state.

For mounting the connector on the shield wall 60, the rear end part of the connector (cylindrical parts 33) is inserted in connector mounting holes 61 formed in the shield wall 60 so as to have the aluminum flange 52 butted against the peripheral rim part of the connector mounting holes 61. Since a part of the packing 63 (engagement pieces 64) is interposed between the flanges 34, 52 so as not to fall off from the connector, the mounting operation can be executed easily Bolts are inserted in bolt holes 59 formed in the aluminum flange 52 so as to be screwed in unillustrated screw parts formed in the shield wall 60. Accordingly, the aluminum flange 52 is forced against the shield wall 60 so that the outer rim part of the aluminum flange 52 is closely contacted with the shield wall 60 so as to be conducted and connected. The housing component member 31 serves as a shield shell for surrounding and shielding the male terminal metal fixtures 36.

When the aluminum flange 52 is forced against the shield wall 60, the packing 63 is flattened by a predetermined amount so as to waterproof between the shield wall 60 and the connector. Since the aluminum flange 52 has higher strength and heat resistant property compared with those made from a synthetic resin, deformation of the aluminum flange 52 is small even in the case it is applied with heat or stress. Accordingly, the packing 63 and the shield wall 60 can be forced against with each other stably so as to improve the water proof reliability.

According to the connector of this embodiment, since the engagement pieces 64 elongating from the packing 63 are interposed between the flanges 34, 52 comprising the housing component members 30, 31 so as to prevent fall-off of the packing 63, the operation of mounting the connector on the shield wall 60 can be facilitated. Furthermore, since the gap 71 between the flanges 34, 52 storing the engagement pieces 64 can always have a constant distance according to contact of the butting projecting bar 70 and the resin flange 34, the engagement pieces 64 stored therein cannot be flattened excessively Accordingly, the problem of the water proof property deterioration due to strong strain on the packing main body can be prevented as well as the housing component members 30, 31 can be positioned accurately without suffering the influence of the deformation amount of the engagement pieces 64.

The invention is not limited to the embodiment explained according to the above-mentioned description and drawings, but, for example, the following embodiments are included in the technical range of the invention. Furthermore, still other modifications can be executed without departing from the scope of the invention.

Figure 8A:
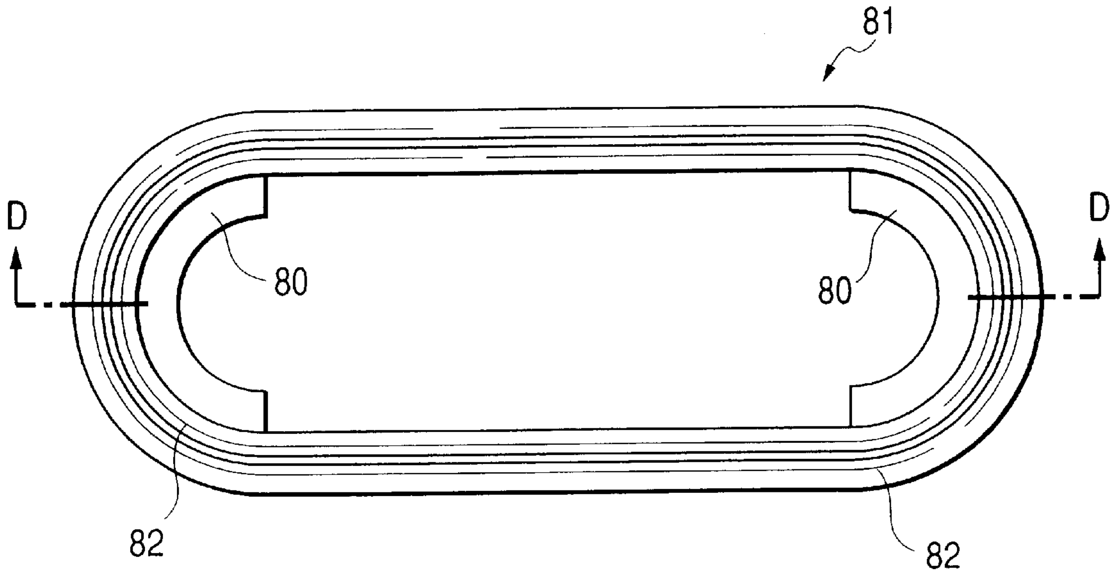
FIG. 8A is a plan view of a packing according to a first modified embodiment.
Figure 8B:
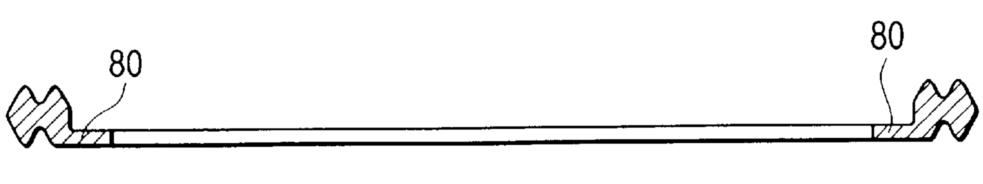
FIG. 8B is a cross-sectional view thereof taken on the cutting plane D—D.

(1) The engagement pieces of the invention is not limited to the configuration of the above-mentioned embodiment. For example, as shown in FIGS. 8A and 8B, engagement pieces 80, 80 may be projected inward from curved parts 82, 82 at both sides of a packing 81, with the engagement pieces 80 provide an arc-like shape as a whole.

Figure 9A:
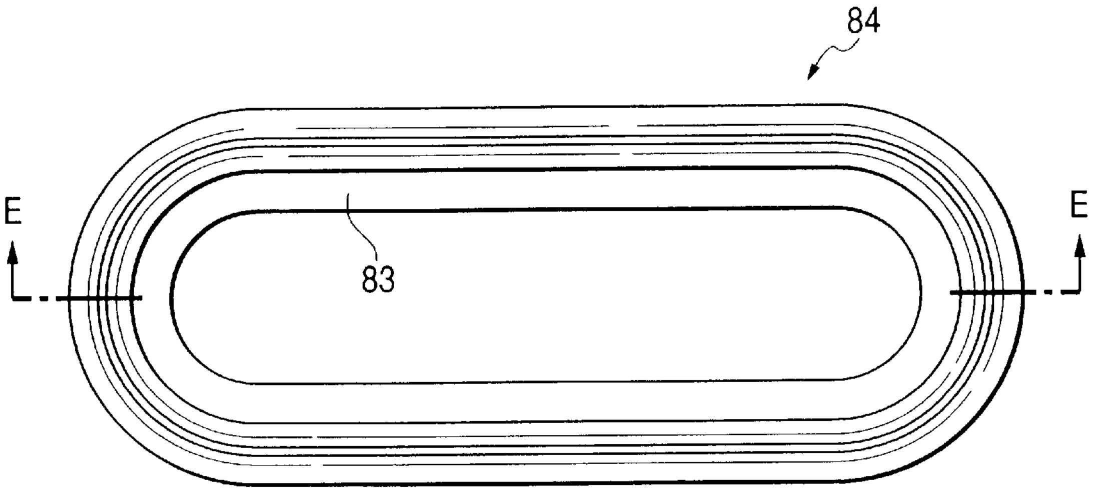
FIG. 9A is a plan view of a packing according to a second modified embodiment.
Figure 9B:
FIG. 9B is a cross-sectional view thereof taken on the cutting plane E—E.

(2) Moreover, as shown in FIGS. 9A and 9B, an engagement piece 83 may be formed along the entirety of the inner peripheral surface of a packing 84.

(3) Although a butting part of the invention (butting projecting bar 70) is provided in the aluminum flange 52 so as to be contacted with the resin flange 34 in the above-mentioned embodiment, for example, the front surface of the base part 32 of the first housing component member 30 and the deep surface of the recess part 52A in the embodiment can be provided as butting parts in the invention such that the housing component members are positioned so as to provide a gap between the flanges 34, 52 according to contact thereof.

What is claimed is:

1. A panel mounting connector comprising:

a pair of housing component members to be assembled with each other for providing a connector housing;

a housing engagement means for maintaining the housing component members in the assembled state, a first flange projecting sideward from one of the housing component members, a second flange projecting sideward from the outer one of the housing component members at a lower level with respect to the first flange to be superimposed on the first flange, a packing provided on the first flange to surround the outer side of the second flange, and an engagement piece elongated inward from the packing, the engagement piece interposed between the first flange and the second flange, wherein the packing with the engagement piece is securely held in place only by the first flange and the second flange prior to mounting the panel mounting connector on to a panel.

2. The panel mounting connector according to claim 1, wherein butting parts are provided in the housing component members for positioning the housing component members according to contact with each other such that a gap is formed between the flanges, with the engagement piece stored in the gap.

3. The panel mounting connector according to claim 1, further comprising butting parts that are provided in the housing component members for positioning the housing component members in contact with each other so that is formed between the first flange and the second flange with the engagement piece stored in the gap.

4. The panel mounting connector according to claim 1, wherein the first flange is mounted by forcing the packing on an opening rim of a connector mounting hole formed in a panel.

5. The panel mounting connector according to claim 1, wherein one of the housing component members with the flange projecting sideward is an aluminum die-cast having conductivity characteristics.

6. The panel mounting connector according to claim 1, wherein one of the flanges is a resin flange that is butted against an inner rim side of a deep wall of a ring-like groove with the packing provided on the outer side of the resin flange.

7. The panel mounting connector according to claim 6, wherein a butting projection bar projects toward the resin flange from a part of the deep wall of the ring-like groove facing the resin flange.

8. The panel mounting connector according to claim 1, wherein the housing component members are positioned and stopped by pressing a pair of pins projected rearward from one of the housing component members into a pair of press-in holes formed in one of the other housing component members.

* * * * *